(12) United States Patent
Vanderwiel

(10) Patent No.: US 6,820,174 B2
(45) Date of Patent: Nov. 16, 2004

(54) MULTI-PROCESSOR COMPUTER SYSTEM USING PARTITION GROUP DIRECTORIES TO MAINTAIN CACHE COHERENCE

(75) Inventor: Steven Paul Vanderwiel, Inver Grove Heights, MN (US)

(73) Assignee: International Business Machines Corporation, Armonk, NY (US)

(*) Notice: Subject to any disclaimer, the term of this patent is extended or adjusted under 35 U.S.C. 154(b) by 91 days.

(21) Appl. No.: 10/052,598

(22) Filed: Jan. 18, 2002

(65) Prior Publication Data

US 2003/0140197 A1 Jul. 24, 2003

(51) Int. Cl.[7] .............................................. G06F 12/00
(52) U.S. Cl. ...................... 711/141; 711/119; 711/130; 709/212; 709/213
(58) Field of Search ................................. 711/141, 119, 711/130; 709/212, 213

(56) References Cited

U.S. PATENT DOCUMENTS

| | | | | |
|---|---|---|---|---|
| 5,535,116 A | * | 7/1996 | Gupta et al. .................. 700/5 |
| 5,864,671 A | * | 1/1999 | Hagersten et al. ........... 709/213 |
| 6,105,113 A | * | 8/2000 | Schimmel .................... 711/146 |
| 6,279,084 B1 | * | 8/2001 | VanDoren et al. ........... 711/141 |
| 6,631,450 B1 | * | 10/2003 | Arimilli et al. .............. 711/146 |
| 6,654,857 B2 | * | 11/2003 | Arimilli et al. .............. 711/141 |

OTHER PUBLICATIONS

David A. Patterson, Computer Architecture A Quantitative Approach, 1996, Morgan Kaufman, 2nd edition, pp. 680–681.*

Milo Tomasevic & Veljko Milutinovic, "Hardware Approaches to Cache Coherence in Shared–Memory Multiprocessors, Part 1"; IEEE Micro, Oct. 1994, pp. 52–59.

* cited by examiner

Primary Examiner—Mano Padmanabhan
Assistant Examiner—Mehdi Namazi
(74) Attorney, Agent, or Firm—Dugan & Dugan

(57) ABSTRACT

In a multi-processor computer system, the processors are divided into broadcast groups and partition groups, with each processor belonging to exactly one broadcast group and exactly one partition group. Each processor holds a partition group directory indicative of contents of the caches associated with each other processor of the partition group. For read or write operations a processor broadcasts a message to other members of its broadcast group. The members of the broadcast group consult their respective partition directories to provide a complete response to a request for a needed item of data.

31 Claims, 3 Drawing Sheets

US 6,820,174 B2

MULTI-PROCESSOR COMPUTER SYSTEM USING PARTITION GROUP DIRECTORIES TO MAINTAIN CACHE COHERENCE

FIELD OF THE INVENTION

This invention relates to computer systems that include multiple processors, and is more particularly concerned with management of cache memories in such systems.

BACKGROUND OF THE INVENTION

Computer systems which employ multiple processors are well known. One example of a commercially available multi-processor computer system is the pSeries line of systems available from the International Business Machines Corporation, which is the assignee hereof.

FIG. 1 is a simplified block diagram showing the architecture of a typical multi-processor computer system. In the example shown in FIG. 1, reference numeral 10 generally indicates the computer system, which includes a plurality (e.g., m) of multi-chip modules (MCMs) 12 (also indicated as MCM0 through MCMm-1 in the drawing). Each multi-chip module 12 includes a plurality (e.g., n) of processors 14, of which only the processors indicated as P0 through Pn-1 of MCM0 are shown. The computer system 10 also includes a main memory 16 constituted by a plurality of memory modules 18. One or more of the memory modules 18 and/or portions thereof may be associated with each of the processors 14.

An interconnection network 20 provides connections among the multi-chip modules 12 and the memory modules 18. (To simplify the drawing, the connections among the processors 14 of MCM0 are not shown.)

Each processor 14 also has a cache memory 22 associated therewith included on the corresponding multi-chip module 12. As is familiar to those who are skilled in the art, cache memories are relatively small, high-speed buffers located near the processors that they serve, and are used to store copies of data that has recently been used by a processor and/or is likely to be used by the processor in the near future. Use of cache memory can frequently reduce the period of time for data access that would otherwise be required for accessing to main memory.

When cache memories are used in multi-processor computer systems, the well-known problem of "cache coherence" arises. In essence, cache coherence deals with the situation in which data held in one cache is changed, thereby requiring steps to be taken to assure that inconsistent copies of the data are not present in other caches. A number of approaches to securing cache coherence are surveyed in Tomasevic et al., "Hardware Approaches to Cache Coherence in Shared-Memory Multiprocessors, Part 1", *IEEE Micro*, Volume 14, Number 5, October 1994, pages 52–59. Many known solutions can be categorized as either directory-based or broadcast (also known as "snoopy") solutions. In general, in directory-based solutions, a directory is associated with each segment of main memory to keep track of corresponding copies of data in the various cache memories. A disadvantage of this type of solution is that there can be significant waiting time while the directory for the relevant memory segment is accessed. In addition, the total size of the directories may be quite large.

In broadcast approaches, messages relating to memory operations are broadcast on a network that all cache controllers monitor ("snoop" on) and then take appropriate action to assure cache coherence. Responses are then sent to confirm that the appropriate actions have been taken by each cache controller. However, particularly in systems having large numbers of processors and caches, there can be significant delays involved in the broadcast/response process.

It would be desirable to provide a technique which avoids the disadvantages of prior art approaches to maintaining cache coherence.

SUMMARY OF THE INVENTION

According to a first aspect of the invention, a method of managing cache memories is provided in a computer system that includes a first plurality of processors and a like plurality of cache memories, wherein each cache memory is associated with one of the processors. The method according to this aspect of the invention includes defining second and third pluralities of the processors as mutually exclusive subsets of the first plurality of processors, storing a respective first directory in association with each of the processors of the second plurality of processors, wherein the first directory associated with each processor of the second plurality of processors indicates contents of the cache memories associated with the other processors of the second plurality of processors, and storing a respective second directory in association with each of the processors of the third plurality of processors, wherein the second directory associated with each processor of the third plurality of processors indicates contents of the cache memories associated with the other processors of the third plurality of processors.

The first directories and the second directories may indicate all contents of the respective cache memories or may only indicate modifications of the data stored in the cache memories relative to the data stored in main memory.

According to a second aspect of the invention, a method of managing cache memories in a computer system is provided, wherein the computer system includes a first plurality of processors and a like plurality of cache memories, with each cache memory associated with a respective one of the processors. The method according to this aspect of the invention includes defining a second plurality of the processors as a subset of the first plurality of processors, wherein the second plurality of processors includes a first processor, storing a respective first directory in association with each of the processors of the second plurality of processors, the first directory associated with each processor of the second plurality of processors indicating contents of the cache memories associated with the other processors of the second plurality of processors, modifying data stored in the cache memory associated with the first processor, sending a message to each of the processors of the second plurality of processors other than the first processor to inform the other processors of the modification of the data in the cache memory associated with the first processor, and modifying each of the first directories associated with the other processors of the second plurality of processors to reflect the modification of the data in the cache memory associated with the first processor.

In accordance with a third aspect of the invention, a method of managing cache memories in a computer system is provided. The computer system includes a plurality of processors and a like plurality of cache memories, with each cache memory associated with a respective one of the processors. The plurality of processors includes a first processor that belongs to a first group of the processors and belongs to a second group of the processors, with no other processor belonging to both the first group and the second group. The method in accordance with this aspect of the invention includes storing a directory in association with each processor of the second group, wherein the directory associated with each processor of the second group indicates contents of the cache memories associated with the other processors of the second group, broadcasting a message in regard to a read operation from the first processor to all the other processors of the first group, and accessing the directory stored in association with the first processor to determine if data relevant to the read operation is stored in a cache memory associated with any processor of the second group other than the first processor.

In accordance with a fourth aspect of the invention, a method of accessing an item of data is provided in a computer system that includes a plurality of processors and a like plurality of cache memories, with each cache memory associated with a respective one of the processors. The method according to this aspect of the invention includes interrogating the cache memory associated with a first processor of the plurality of processors, wherein the first processor belongs to a first group of the processors and belongs to a second group of the processors that is different from the first group of the processors. The method further includes broadcasting a message from the first processor to each other processor of the first group of processors, and interrogating a first directory associated with the first processor and indicative of contents of the cache memories associated with other processors of the second group of processors.

The method further includes responding to the broadcast message by interrogating cache memories associated with each other processor of the first group of processors, and further responding to the broadcast message by interrogating a respective second directory associated with each other processor of the first group of processors, wherein each second directory is indicative of contents of cache memories associated with other processors of a respective group of processors to which the respective other processor of the first group of processors belongs. The method also includes accessing a main memory of the computer system.

The technique of the present invention provides greater efficiency than conventional broadcast approaches to maintaining cache coherence, while also avoiding use of large directories and delays that accompany directory-based approaches to cache coherence.

Other objects, features and advantages of the present invention will become more fully apparent from the following detailed description of exemplary embodiments, the appended claims and the accompanying drawings.

DETAILED DESCRIPTION

Figure 1:
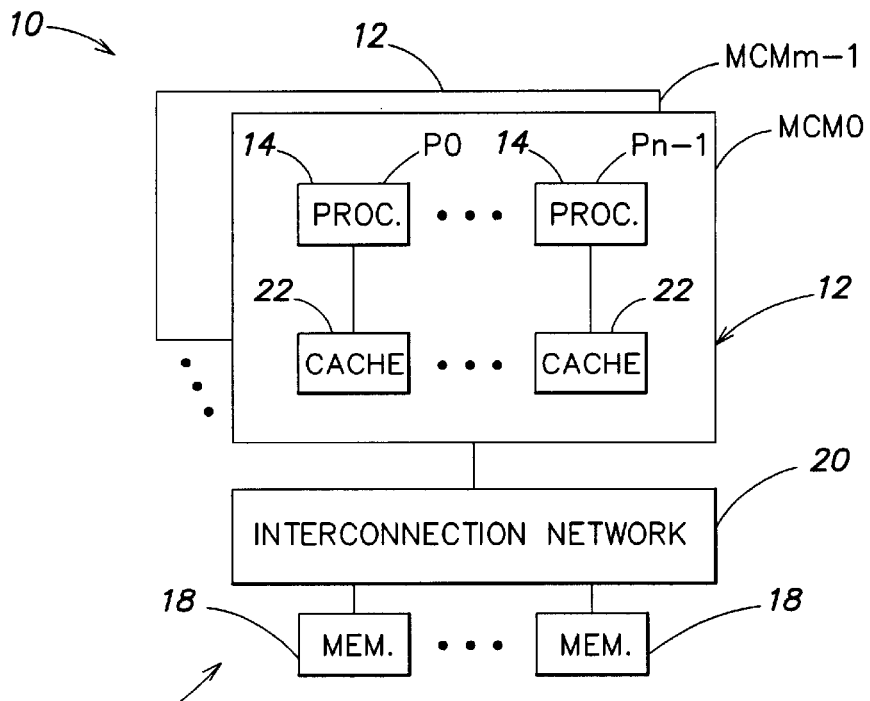
FIG. 1 is a simplified block diagram of a conventional multi-processor computer system in which the present invention may be applied.

For purposes of further discussion, it will be assumed that the present invention is applied in the multi-processor computer system 10 illustrated in FIG. 1, that the number of multi-chip modules 12 is eight (m=8) and the number of processors 14 per multi-chip module 12 is four (n=4), so that the total number of processors 14 in the computer system 10 is thirty-two in this example. However, it should be understood that the invention is not so limited, and may be applied in a multi-processor computer system having more or fewer than thirty-two processors, having more or fewer than eight multi-chip modules, having more or fewer than four processors per multi-chip module, or, indeed, may be applied in a multi-processor computer system in which processors are not mounted on multi-chip modules.

Figure 2:
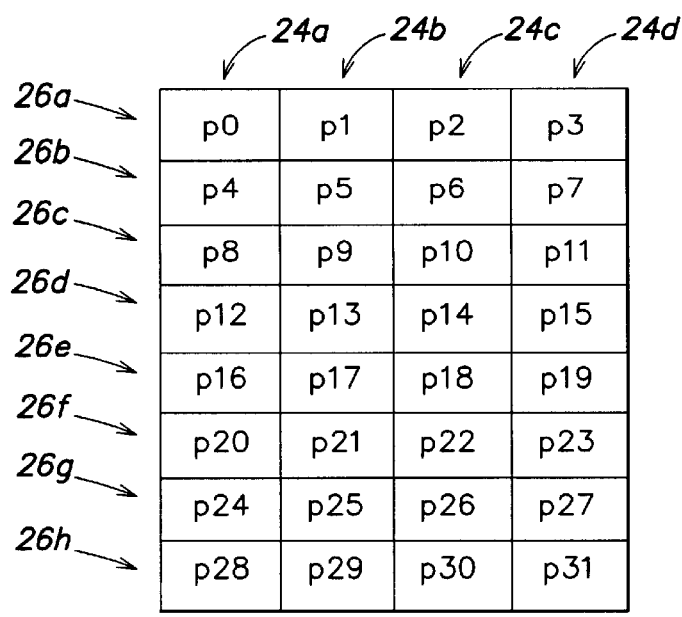
FIG. 2 schematically illustrates groupings of processors in accordance with the invention.

FIG. 2 is a matrix that schematically represents grouping of processors P0 to P31 into broadcast groups and partition groups in accordance with the invention. In FIG. 2, the columns of the matrix correspond to partition groups 24a–d of the processors, and the rows of the matrix correspond to broadcast groups 26a–h of the processors. Conveniently, each broadcast group 26a–h in this example is constituted by the four processors installed on a respective one of the multi-chip modules 12, to facilitate communication among the processors of the broadcast group 26a. Thus, for example, a first broadcast group corresponding to the first row of the matrix of FIG. 2, is made up of processors P0, P1, P2 and P3, all installed on the first multi-chip module MCM0 of the computer system 10. Also, each partition group 24a–d has one and only one member processor from each of the eight multi-chip modules 12 of the computer system 10. As shown in FIG. 2, in at least one embodiment, the number of processors in a partition group may be greater than the number of processors in a broadcast group. It will be observed that there are four partition groups 24a–d, corresponding to the number of processors per multichip module 12, and there are eight broadcast groups 26a–h, corresponding to the number of multichip modules 12 in the computer system 10. However, it is not required that the number of partition groups corresponds to the number of processors per multichip module, nor that the number of broadcast groups corresponds to the number of multi-chip modules in the computer system. Also, as noted before, it is not required that the computer system be constructed with multi-chip modules.

It will also be observed that each processor 14 (P0–P31) is in only one partition group 24a–d and in only one broadcast group 26a–h. Moreover, each partition group 24a–d has one and only one member processor in common with each broadcast group 26a–h, and each broadcast group 26a–h has one and only one member processor in common with each partition group 24a–d. The significance and functions of the broadcast groups 26a–h and the partition groups 24a–d will become apparent from the following discussion.

Figure 3:
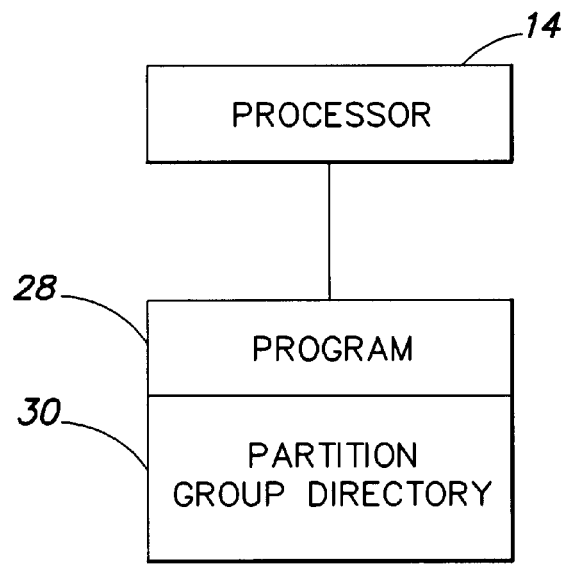
FIG. 3 is a block diagram that schematically illustrates resources associated with one of the processors of FIGS. 1 and 2 in accordance with the invention.

FIG. 3 is a simplified block diagram illustrating resources associated with each one of the processors 14 (P0–P31 in FIG. 2) in accordance with the invention. In FIG. 3, reference numeral 28 indicates a stored program which controls operation of the processor 14. The program 28 may be stored, and instructions fetched therefrom, in accordance with conventional practices.

Figure 4:
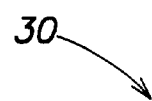
FIG. 4 schematically illustrates a partition group directory provided in accordance with the invention and shown in FIG. 3.
Figure 4:
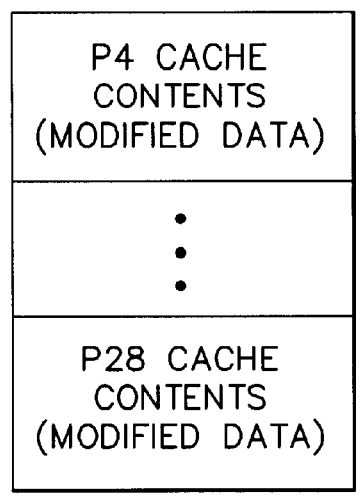

Reference numeral 30 indicates a partition group directory which is associated with the processor 14 and is provided in accordance with the invention. For each processor 14, the respective partition group directory 30 stores data indicative of contents of the caches 22 associated with the other processors 14 of the partition group 24a–d to which the respective processor 14 belongs. For example, the partition group directory 30 associated with processor P0 (FIG. 2) is illustrated in FIG. 4. It will be noted that the partition group directory 30 associated with processor P0 includes entries indicative of the contents of the caches 22 for processors P4 through P28 (counting by fours), which are the other processors in the same partition group 24a with processor P0 (FIG. 2). In one embodiment of the invention, the entries relating to the contents of the caches 22 for the other processors in the same partition group only indicate data that has been modified relative to the contents of main memory 16 (FIG. 1). In this embodiment, the sizes of the partition group directories 30 may be relatively small. In an alternative embodiment, the entries of the partition group directories 30 may reflect all of the data, whether modified or not, in the caches 22 for the other processors in the same partition group. In the ensuing discussion of processes carried out in accordance with the invention, it will be assumed that the entries of the partition group directories 30 indicate only modified data contained in the caches 22.

Each partition group directory 30 may, for example, be stored in a buffer (e.g., a different buffer than that used to implement the cache 22 for the respective processor P0–P31).

Figure 5:
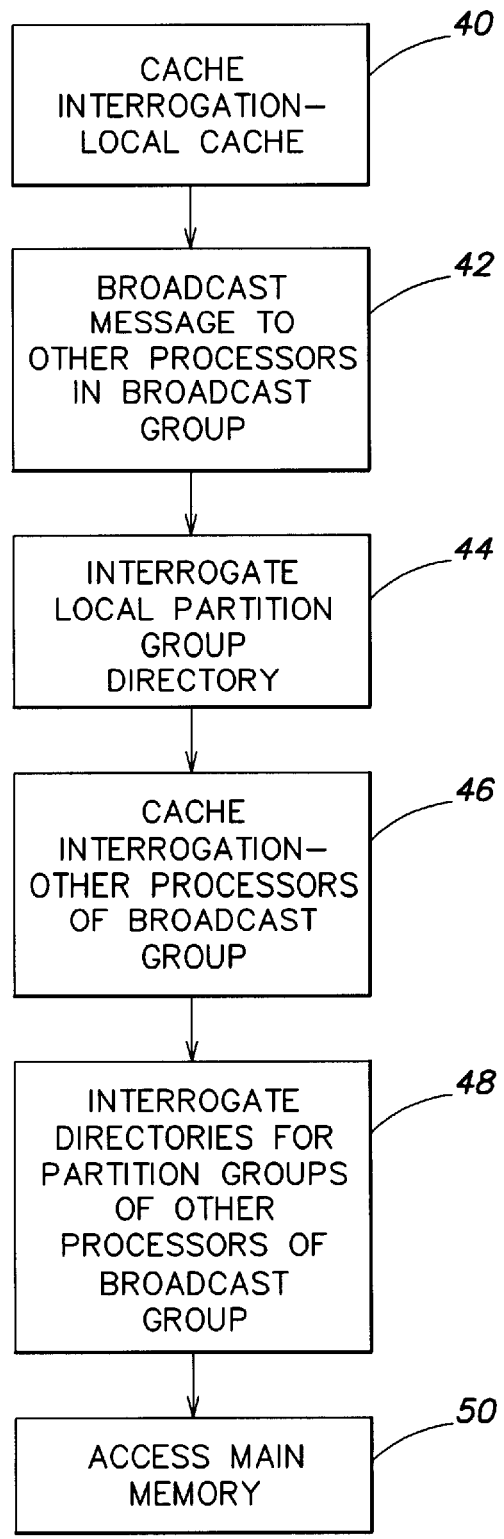
FIG. 5 is a flow chart that illustrates a process for managing cache memories provided in accordance with the invention.

A generalized process for cache management carried out in accordance with the invention is illustrated in the form of a flow chart in FIG. 5. The process illustrated in FIG. 5 is generally applicable to both read and write operations; particular examples of read and write operations will be provided below.

Initially in FIG. 5 is a step 40. At step 40, it is determined, upon initiation of the read or write operation, whether the cache 22 associated with the processor carrying out the operation (one of the processors P0–P31 of FIG. 2, also referred to as the "first processor") contains the item of data to be accessed. This checking of the contents of the local cache 22 is referred to as local cache interrogation. Following the local cache interrogation is step 42, at which the first processor carrying out the operation broadcasts a message concerning the data to be accessed to the other processors in the broadcast group to which the first processor belongs (e.g., one of the broadcast groups 26a–h of FIG. 2). Following step 42 (or alternatively, preceding step 42) is step 44, at which the first processor checks the partition group directory 30 associated with the first processor to determine whether the cache 22 of any other processor in the partition group of the first processor (e.g., one of partition groups 24a–d of FIG. 2) contains modified data which corresponds to the item of data to be accessed.

At step 46 the other processors of the broadcast group of the first processor respond to the message broadcast at step 42 by checking the contents of their respective local caches 22 to determine if the local caches 22 have the item of data to be accessed.

Either before or after step 46 is step 48 at which, further in response to the message broadcast at step 42, the other processors of the broadcast group of the first processor check the partition group directories 30 of the partition groups to which the other processors belong to determine whether the respective caches 22 of the other processors of the other partition groups contain modified data corresponding to the item of data to be accessed.

At step 50, which may be performed if none of steps 40, 44, 46, 48 produced the item of data in question, main memory 16 is accessed by the first processor to obtain the needed data.

It is to be appreciated that, with the provision of the partition group directories 30, the caches 22 of all of the processors of the computer system 10 may be canvassed, based on a broadcast message sent only to the relatively small number of processors in the broadcast group of the processor which is attempting to access an item of data. This avoids the lengthy cycles required in a conventional computer system for broadcasting messages to all processors of the conventional computer system and awaiting responses therefrom. Also, relatively small partition group directories 30 may be used, particularly if the partition group directories 30 indicate only modified data held in the caches 22.

There will now be described examples of read and write operations carried out in accordance with the invention.

EXAMPLE 1

For the purposes of this example, it will be assumed that processor P0 is to carry out a read operation, and that the item of data to be read is present in modified form in the cache 22 for processor P15. The following steps are performed in this case.

1. Processor P0 interrogates its local cache 22 and does not find the needed item of data.
2. Processor P0 issues a broadcast message to the other processors in its broadcast group (i.e. to processors P1, P2, P3 in broadcast group 26a); processor P0 also interrogates its partition group directory.
3. In response to the message from processor P0, processors P1, P2 and P3 interrogate their own caches and do not find the needed item of data.
4. Processors P1, P2 and P3 interrogate their partition group directories 30.
5. Processors P1 and P2 do not find an entry corresponding to the needed item of data in their partition group directories 30, and send a negative response to processor P0.
6. Processor P3 finds an entry in its partition group directory 30 indicating that the cache 22 corresponding to processor P15 has a copy of the needed item of data (processors P3 and P15 being members of the same partition group 24d).
7. Processor P3 sends a response to processor P0 to inform processor P0 that processor P3 can supply the needed data.
8. Processor P3 sends a command to processor P15 directing processor P15 to supply the needed data to processor P0.
9. Processor P15 receives the command from processor P3 and responds by supplying the needed data to processor P0.
10. Processor P15 sends a command to the other processors in its partition group (partition group 24d) that they must invalidate their partition group directory entries for the relevant item of data. (This is necessary because, with the supplying of the data to Processor P0, the status of the data in the cache 22 of Processor P15 is changed from "modified" to "shared".)

As an alternative to steps 7–9 as set forth above, processor P3 may send a response to processor P0 informing processor P0 that processor P15 can supply the needed data. Processor P0 then sends a command to processor P15 directing processor P15 to supply the needed data and processor P15 responds to the command from processor P0 by supplying the needed data.

EXAMPLE 2

It is assumed for the purposes of this example that processor P0 is to carry out a read operation with respect to an item of data that is not present in any processor's cache.

1. Processor P0 interrogates its local cache 22 and does not find the needed item of data.
2. Processor P0 issues a broadcast message to the other processors in its broadcast group (broadcast group 26a); processor P0 also interrogates its partition group directory 30.
3. In response to the message from processor P0, processors P1, P2 and P3 interrogate their own caches 22 and do not find the needed item of data.
4. Processors P1, P2 and P3 interrogate their partition group directories 30.
5. Processors P1, P2 and P3 do not find an entry for the needed data in their partition group directories 30, and send a negative response to processor P0.
6. Processor P0 also has not found a corresponding entry in its partition group directory 30. (Consequently, based on the negative responses from the other processors in the broadcast group 26a of processor P0, the needed data is not present in any other cache. Strictly speaking, an unmodified copy of the needed data may be present in a cache corresponding to one of the processors other than P0, P1, P2, P3, but cannot be found using the partition group directories 30 which only record the presence of modified data.)
7. Processor P0 sends a request for the needed data to the processor which controls the memory module 18 in main memory 16 that holds the needed data. (It is assumed that the processor controlling the relevant memory module 18 is known ahead of time, based on the address of the needed data.)
8. The processor which controls the relevant memory module 18 sends the needed data to processor P0.

EXAMPLE 3

It is assumed for the purposes of this example that processor P0 is to perform a write operation with respect to an item of data that is present in a modified condition in the cache 22 for processor P15.
1. Processor P0 interrogates its local cache 22 and does not find the needed item of data.
2. Processor P0 issues a broadcast message to the other processors in its broadcast group 26a; processor P0 also interrogates its partition group directory 30.
3. In response to the message from processor P0, processors P1, P2 and P3 interrogate their own caches 22 and do not find the needed item of data.
4. Processors P1, P2 and P3 interrogate their partition group directories 30.
5. Processors P1 and P2 do not find an entry corresponding to the needed item of data in their partition group directories 30, and send a negative response to processor P0.
6. Processor P3 finds an entry in its partition group directory 30 indicating that the cache 22 corresponding to processor P15 has a copy of the needed item of data.
7. Processor P3 sends a response to processor P0 to inform processor P0 that processor P3 can supply the needed data.
8. Processor P3 sends a command to processor P15 directing processor P15 to supply the needed data to processor P0.
9. Processor P15 broadcasts a command to the other processors in its partition group (partition group 24d) informing the other processors that they must invalidate their partition group directory entries for the relevant item of data to reflect the fact that this item of data will no longer be present in the cache 22 for processor P15.
10. Processor P15 sends the needed data to processor P0 and invalidates the copy of the needed data that is present in the cache 22 of processor P15.
11. Processor P0 receives the needed data and sends a command to the other processors in its partition group (partition group 24a) informing the other processors to create an entry in their respective partition group directories 30 to indicate that processor P0 has in its cache a modified copy of the item of data in question.
12. Processor P0 modifies the item of data.

EXAMPLE 4

It is assumed for the purposes of this example that processor P0 is to perform a write operation with respect to an item of data that is not presently in another processor's cache or alternatively is present in another processor's cache (other than caches for processors P1, P2, P3), but only in an unmodified state.
1. Processor P0 interrogates its local cache 22 and does not find the needed item of data.
2. Processor P0 issues a broadcast message to the other processors in its broadcast group 26a; processor P0 also interrogates its partition group directory 30.
3. In response to the message from processor P0, processors P1, P2 and P3 interrogate their own caches 22 and do not find the needed item of data.
4. Processors P1, P2 and P3 interrogate their partition group directories 30.
5. Processors P1, P2 and P3 do not find an entry for the needed data in their partition group directories 30, and send a negative response to processor P0.
6. Processor P0 also has not found a corresponding entry in its partition group directory 30. (Consequently, based on the negative responses from the other processors in the broadcast group 26a of processor P0, the needed data is not present in any other cache 22.)
7. Processor P0 sends a request for the needed data to the processor which controls the memory module 18 in main memory 16 that holds the needed data. (It is assumed that the processor controlling the relevant memory module 18 is known ahead of time, based on the address of the needed data.)
8. The processor which controls the relevant memory module 18 sends the needed data to processor P0.
9. Processor P0 broadcasts a message to every other processor P1–P31 in the computer system 10 informing the other processors that the item of data in question is to be modified by processor P0.
10. Any processor that holds a copy of the item of data in its cache 22 invalidates the copy.
11. All processors other than processor P0 acknowledge receipt of the message from processor P0 by sending a suitable response to processor P0.
12. The other processors of the partition group of processor P0 (partition group 24a) update their partition group directories 30 to indicate that processor P0 has in its cache 22 a modified copy of the item of data.
13. When processor P0 has received all of the responses to the command issued at step 9, processor P0 modifies the item of data.

It is to be understood that the operations described in the above examples would be truncated if one of the other processors in the broadcast group 26a of processor P0 were to have a copy of the needed data in its cache 22. In such a case, for example, assuming processor P1 had the needed data in its cache 22, then following step 3 in example 1 processor P1 would simply send the needed data to processor P0.

The process of FIG. 5, and any additional steps required to carry out the operations described in examples 1–4 may be implemented in hardware, software or a combination thereof. In at least one embodiment the process of FIG. 5 and any related steps are implemented in hardware employing a suitable combination of logic circuitry on the multi-chip modules 12. A person of ordinary skill in the art may develop logic circuitry capable of performing the inventive process described with reference to FIG. 5. In a software embodiment of the invention, the process of FIG. 5 and any related steps may comprise one or more computer program products. Each inventive computer program product may be carried by a medium readable by a computer (e.g., a carrier wave signal, a floppy disk, a hard drive, a random access memory, etc.).

The foregoing description discloses only exemplary embodiments of the invention; modifications of the above disclosed apparatus and method which fall within the scope of the invention will be readily apparent to those of ordinary skill in the art. For example, although process steps have been set forth in a certain order in the above description, it is contemplated to vary the order of the steps and to perform the steps in any order that is practical. Accordingly, while the present invention has been disclosed in connection with exemplary embodiments thereof, it should be understood that other embodiments may fall within the spirit and scope of the invention, as defined by the following claims.

The invention claimed is:

1. In a computer system that includes a first plurality of processors and a like plurality of cache memories, each cache memory associated with a respective one of the processors, a method of managing the cache memories, the method comprising:

defining second and third pluralities of the processors as mutually exclusive subsets of the first plurality of processors;

storing a respective first directory in association with each of the processors of the second plurality of processors, the first directory associated with each processor of the second plurality of processors indicating contents of the cache memories associated with the other processors of the second plurality of processors; and storing a respective second directory in association with each of the processors of the third plurality of processors, the second directory associated with each processor of the third plurality of processors indicating contents of the cache memories associated with the other processors of the third plurality of processors.

2. The method of claim 1, wherein:

the first directories indicate all contents of the cache memories associated with processors of the second plurality of processors; and the second directories indicate all contents of the cache memories associated with processors of the third plurality of processors.

3. The method of claim 1, wherein:

the first directories indicate only modifications, relative to data stored in main memory, of data stored in the cache memories associated with the processors of the second plurality of processors; and the second directories indicate only modifications, relative to data stored in main memory, of data stored in the cache memories associated with the processors of the third plurality of processors.

4. In a computer system that includes a first plurality of processors and a like plurality of cache memories, each cache memory associated with a respective one of the processors, a method of managing the cache memories, the method comprising:

defining a second plurality of the processors as a subset of the first plurality of processors, the second plurality of processors including a first processor;

storing a respective first directory in association with each of the processors of the second plurality of processors, the first directory associated with each processor of the second plurality of processors indicating contents of the cache memories associated with the other processors of the second plurality of processors;

modifying data stored in the cache memory associated with the first processor;

sending a message to each of the processors of the second plurality of processors other than the first processor to inform the other processors of the modification of the data in the cache memory associated with the first processor; and modifying each of the first directories associated with the other processors to reflect the modification of the data in the cache memory associated with the first processor.

5. In a computer system that includes a plurality of processors and a like plurality of cache memories, each cache memory associated with a respective one of the processors, the plurality of processors including a first processor that belongs to a first group of the processors and belongs to a second group of the processors, no other processor belonging to both the first group and the second group, a method of managing the cache memories, the method comprising:

storing a directory in association with each processor of the second group, the directory associated with each processor of the second group indicating contents of the cache memories associated with the other processors of the second group;

broadcasting a message in regard to a read operation from the first processor to all the other processors of the first group; and accessing the directory stored in association with the first processor to determine if data relevant to the read operation is stored in a cache memory associated with any processor of the second group other than the first processor.

6. The method of claim 5, wherein, in response to the broadcast message, each processor of the first group other than the first processor accesses a directory stored in association with the respective other processor of the first group to determine if data relevant to the read operation is stored in a cache memory associated with any processor of a respective group of processors associated with the respective other processor of the first group.

7. The method of claim 5, wherein all of the processors of the first group are installed together on a single multi-chip module.

8. The method of claim 5, wherein the number of processors in the second group is greater than the number of processors in the first group.

9. In a computer system that includes a plurality of processors and a like plurality of cache memories, each cache memory associated with a respective one of the processors, a method of accessing an item of data, the method comprising:

interrogating the cache memory associated with a first processor of the plurality of processors, the first processor belonging to a first group of the processors, and belonging to a second group of the processors that is different from the first group of the processors;

broadcasting a message from the first processor to each other processor of the first group of processors;

interrogating a first directory associated with the first processor and indicative of contents of the cache memories associated with other processors of the second group of processors;

in response to the broadcast message, interrogating respective cache memories associated with each other processor of the first group of processors;

in response to the broadcast message, interrogating a respective second directory associated with each other processor of the first group of processors, each second directory being indicative of contents of cache memories associated with other processors of a respective group of processors to which the respective other processor of the first group of processors belongs; and accessing a main memory of the computer system.

10. The method of claim 9, wherein the cache contents indicated by the first and second directories include all contents of the respective cache memories.

11. The method of claim 9, wherein the cache contents indicated by the first and second directories are only modifications, relative to data stored in the main memory, of data stored in the respective cache memories.

12. The method of claim 9, wherein no processor other than the first processor belongs to both the first and second groups of processors.

13. A multi-processor computer system, comprising:

a first plurality of processors;

a like plurality of cache memories each associated with a respective one of the processors;

a respective first directory in association with each processor of a second plurality of processors, the second plurality being a subset of the first plurality, the first directory associated with each processor of the second plurality of processors indicating contents of the cache memories associated with the other processors of the second plurality of processors; and a respective second directory in association with each processor of a third plurality of processors, the third plurality being a subset of the first plurality of processors, the second and third pluralities being mutually exclusive, the second directory associated with each processor of the third plurality of processors indicating contents of the cache memories associated with the other processors of the third plurality of processors.

14. The multi-processor computer system of claim 13, wherein:

the first directories indicate all contents of the cache memories associated with processors of the second plurality of processors; and the second directories indicate all contents of the cache memories associated with processors of the third plurality of processors.

15. The multiprocessor computer system of claim 13, wherein:

the first directories indicate only modifications, relative to data stored in main memory, of data stored in the cache memories associated with the processors of the second plurality of processors; and the second directories indicate only modifications, relative to data stored in main memory, of data stored in the cache memories associated with the processors of the third plurality of processors.

16. The multi-processor computer system of claim 13, wherein the first plurality of processors is divided among a plurality of multi-chip modules.

17. The multi-processor computer system of claim 16, wherein the second and third pluralities of processors are both divided among the plurality of multi-chip modules.

18. A multi-processor computer system, comprising:

a first plurality of processors;

a like plurality of cache memories each associated with a respective one of the processors;

a respective first directory in association with each processor of a second plurality of processors, the second plurality being a subset of the first plurality, the second plurality of processors including a first processor, the first directory associated with each processor of the second plurality of processors indicating contents of the cache memories associated with the other processors of the second plurality of processors;

means for modifying data stored in the cache memory associated with the first processor;

means for sending a message to each of the processors of the second plurality of processors other than the first processor to inform the other processors of the modification of the data in the cache memory associated with the first processor; and means for modifying each of the first directories associated with the other processors to reflect the modification of the data in the cache memory associated with the first processor.

19. A multi-processor computer system, comprising:

a plurality of processors, including a first processor that belongs to a first group of the processors and belongs to a second group of the processors, no other processor belonging to both the first group and the second group;

a like plurality of cache memories each associated with a respective one of the plurality of processors;

a directory in association with each processor of the second group, the directory associated with each processor of the second group indicating contents of the cache memories associated with the other processors of the second group;

means for broadcasting a message in regard to a read operation from the first processor to all the other processors of the first group; and means for accessing the directory stored in association with the first processor to determine if data relevant to the read operation is stored in a cache memory associated with any processor of the second group other than the first processor.

20. The multi-processor computer system of claim 19, wherein each processor of the first group other than the first processor is operative to respond to the broadcast message by accessing a directory stored in association with the respective other processor of the first group to determine if data relevant to the read operation is stored in a cache memory associated with any processor of a respective group of processors associated with the respective other processor of the first group.

21. The multi-processor computer system of claim 19, further comprising a multi-chip module that includes all of the processors of the first group.

22. The multi-processor computer system of claim 19, wherein the number of processors in the second group is greater than the number of processors in the first group.

23. A multi-processor computer system, comprising:

a plurality of processors;

a like plurality of cache memories each associated with a respective one of the processors;

means for interrogating the cache memory associated with a first processor of the plurality of processors, the first processor belonging to a first group of the processors, and belonging to a second group of the processors that is different from the first group of the processors;

means for broadcasting a message from the first processor to each other processor of the first group of processors;

means for interrogating a first directory associated with the first processor and indicative of contents of the cache memories associated with other processors of the second group of processors;

means, responsive to the broadcast message, for interrogating respective cache memories associated with each other processor of the first group of processors;

means, also responsive to the broadcast message, for interrogating a respective second directory associated with each other processor of the first group of processors, each second directory being indicative of contents of cache memories associated with other processors of a respective group of processors to which the respective other processor of the first group of processors belongs;

a main memory; and means, associated with the first processor, for accessing the main memory.

24. The multi-processor computer system of claim 23, wherein the cache contents indicated by the first and second directories include all contents of the respective cache memories.

25. The multi-processor computer system of claim 23, wherein the cache contents indicated by the first and second directories are only modifications, relative to data stored in the main memory, of data stored in the respective cache memories.

26. The multi-processor computer system of claim 23, wherein no processor other than the first processor belongs to both the first and second groups of processors.

27. The multi-processor computer system of claim 23, further comprising a multi-chip module that includes all of the processors of the first group.

28. A computer program product for use in a multi-processor computer system having a first plurality of processors and a like plurality of cache memories each associated with a respective one of the processors, the computer program product comprising:

a medium readable by a computer, the computer readable medium having computer program code adapted to:

provide a respective first directory in association with each processor of a second plurality of processors, the second plurality being a subset of the first plurality, the first directory associated with each processor of the second plurality of processors indicating contents of the cache memories associated with the other processors of the second plurality of processors; and provide a respective second directory in association with each processor of a third plurality of processors, the third plurality being a subset of the first plurality of processors, the second and third pluralities being mutually exclusive, the second directory associated with each processor of the third plurality of processors indicating contents of the cache memories associated with the other processors of the third plurality of processors.

29. A computer program product for use in a multi-processor computer system having a first plurality of processors and a like plurality of cache memories each associated with a respective one of the processors, the computer program product comprising:

a medium readable by a computer, the computer readable medium having computer program code adapted to:

provide a respective first directory in association with each processor of a second plurality of processors, the second plurality being a subset of the first plurality, the second plurality of processors including a first processor, the first directory associated with each processor of the second plurality of processors indicating contents of the cache memories associated with the other processors of the second plurality of processors;

modify data stored in the cache memory associated with the first processor;

send a message to each of the processors of the second plurality of processors other than the first processor to inform the other processors of the modification of the data in the cache memory associated with the first processor; and modify each of the first directories associated with the other processors to reflect the modification of the data in the cache memory associated with the first processor.

30. A computer program product for use in a multi-processor computer system having a plurality of processors, including a first processor that belongs to a first group of the processors and belongs to a second group of the processors, no other processor belonging to both the first group and the second group and a like plurality of cache memories each associated with a respective one of the plurality of processors, the computer program product comprising:

a medium readable by a computer, the computer readable medium having computer program code adapted to:

provide a directory in association with each processor of the second group, the directory associated with each processor of the second group indicating contents of the cache memories associated with the other processors of the second group;

broadcast a message in regard to a read operation from the first processor to all the other processors of the first group; and access the directory stored in association with the first processor to determine if data relevant to the read operation is stored in a cache memory associated with any processor of the second group other than the first processor.

31. A computer program product for use in a multi-processor computer system having a plurality of processors and a like plurality of cache memories each associated with a respective one of the processors, the computer program product comprising:

a medium readable by a computer, the computer readable medium having computer program code adapted to:

interrogate the cache memory associated with a first processor of the plurality of processors, the first processor belonging to a first group of the processors, and belonging to a second group of the processors that is different from the first group of the processors;

broadcast a message from the first processor to each other processor of the first group of processors;

interrogate a first directory associated with the first processor and indicative of contents of the cache memories associated with other processors of the second group of processors;

in response to the broadcast message, interrogate respective cache memories associated with each other processor of the first group of processors;

also in response to the broadcast message, interrogate a respective second directory associated with each other processor of the first group of processors, each second directory being indicative of contents of cache memories associated with other processors of a respective group of processors to which the respective other processor of the first group of processors belongs; and access a main memory.

* * * * *